Figure 1:
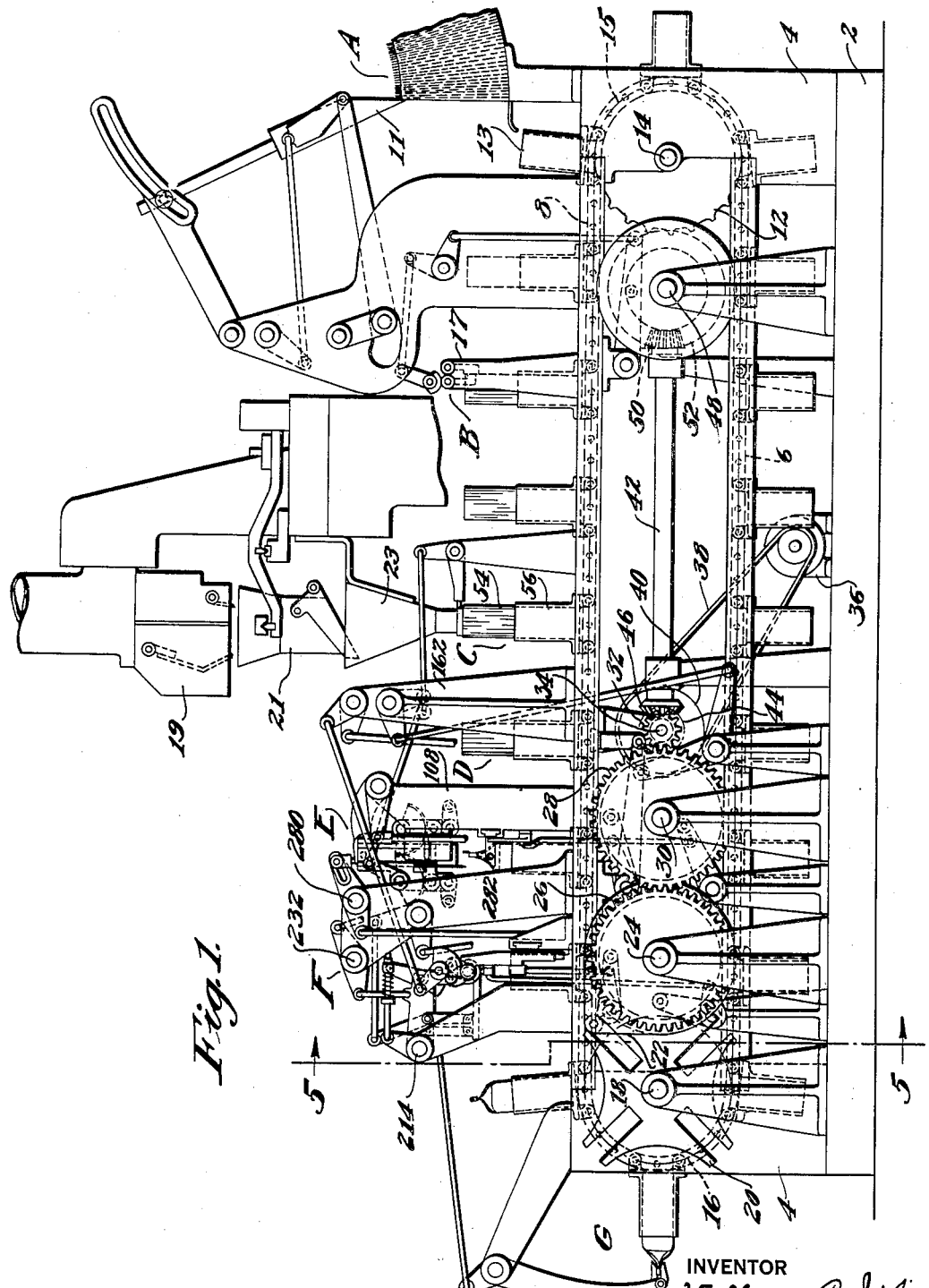

Nov. 8, 1932. W. A. JOPLIN 1,886,552
BAG CLOSING AND FASTENING MACHINE
Filed June 20, 1931 9 Sheets-Sheet 5

INVENTOR
William A. Joplin
BY
J. Stanley Churchill
ATTORNEY

Nov. 8, 1932.  W. A. JOPLIN  1,886,552
BAG CLOSING AND FASTENING MACHINE
Filed June 20, 1931   9 Sheets-Sheet 6
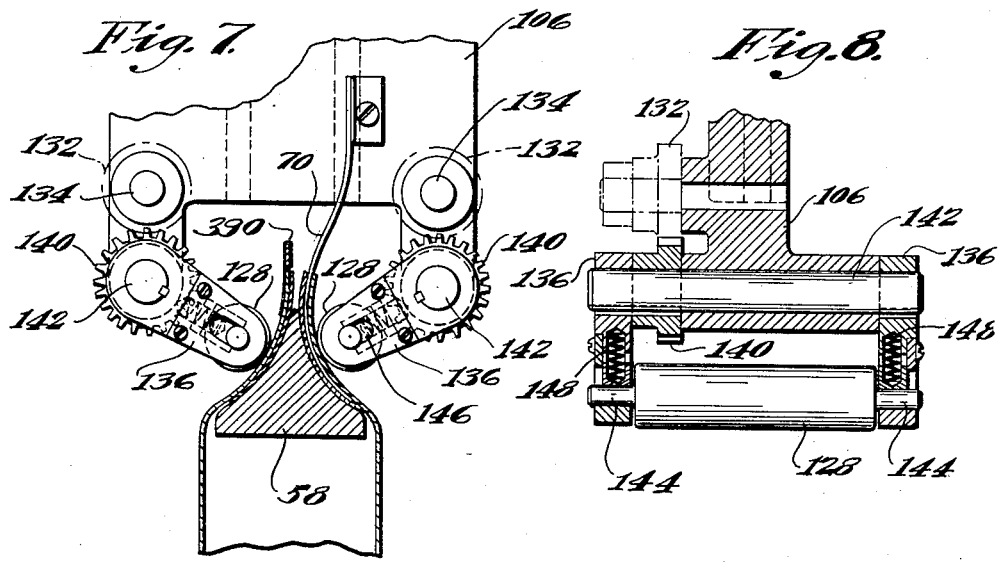
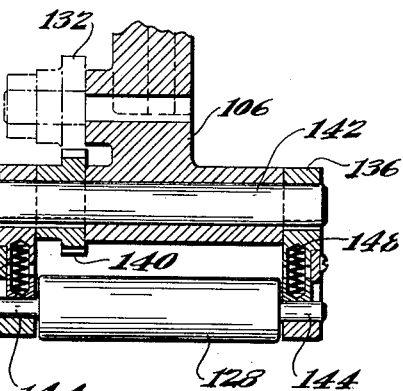
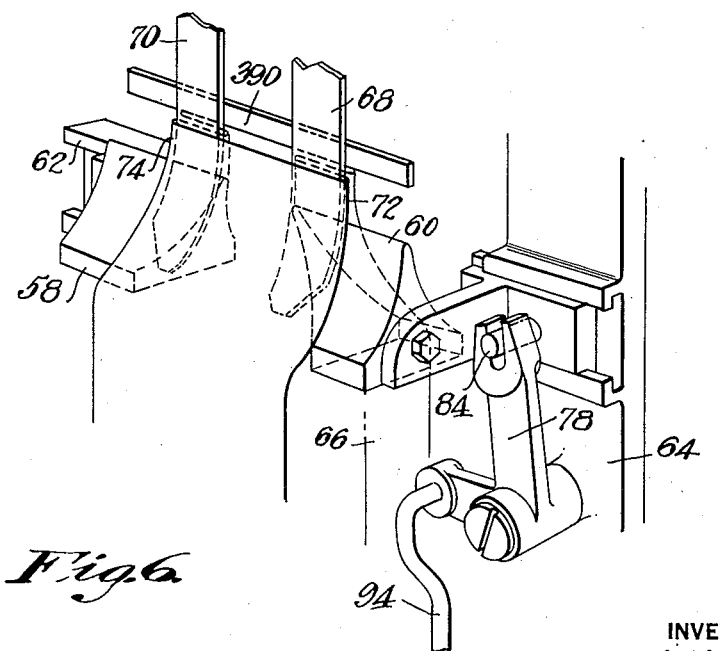
INVENTOR
William A. Joplin
BY
J. Stanley Churchill
ATTORNEY

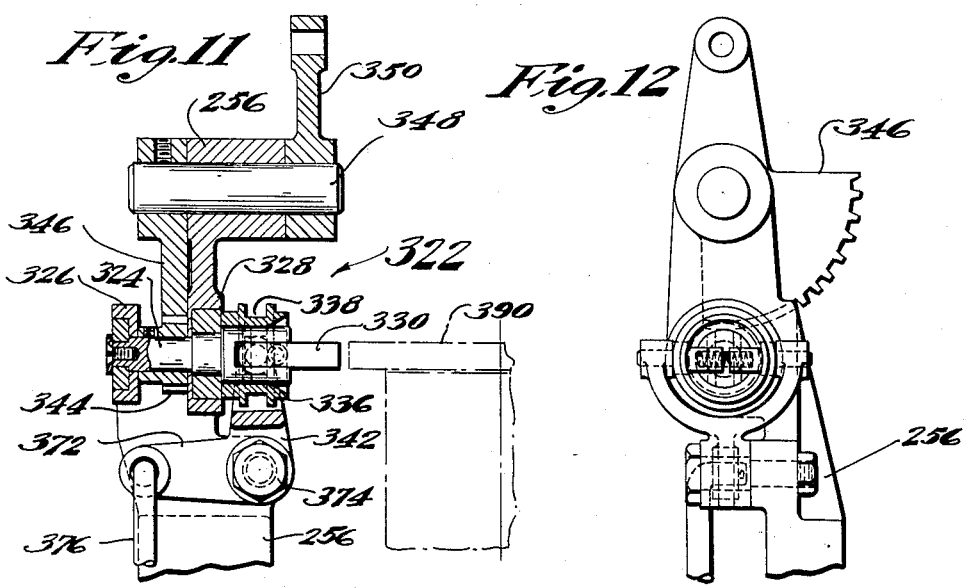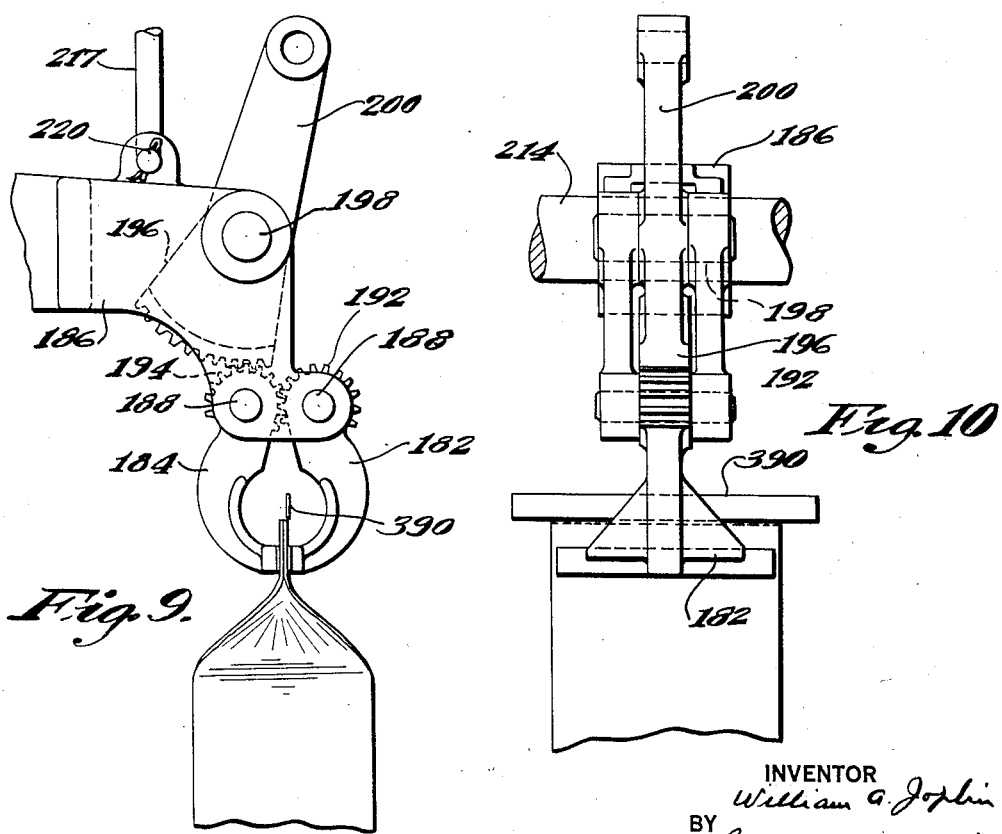

Nov. 8, 1932. W. A. JOPLIN 1,886,552
BAG CLOSING AND FASTENING MACHINE
Filed June 20, 1931 9 Sheets-Sheet 8
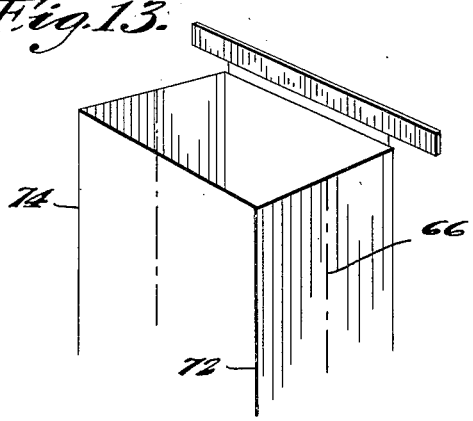
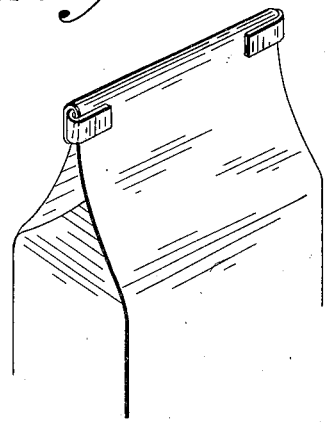
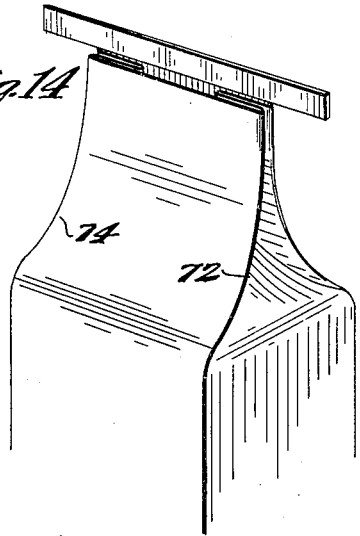
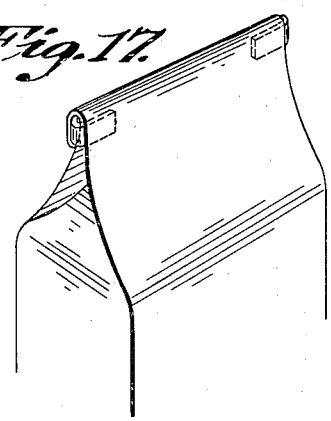
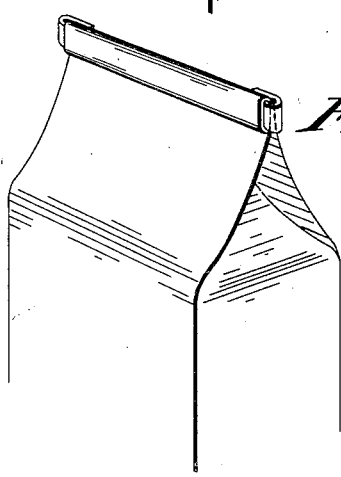
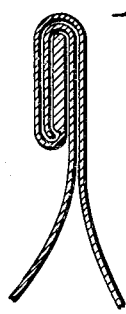
INVENTOR
William A. Joplin
BY
J. Stanley Churchill
ATTORNEY Nov. 8, 1932.   W. A. JOPLIN   1,886,552
BAG CLOSING AND FASTENING MACHINE
Filed June 20, 1931   9 Sheets-Sheet 9
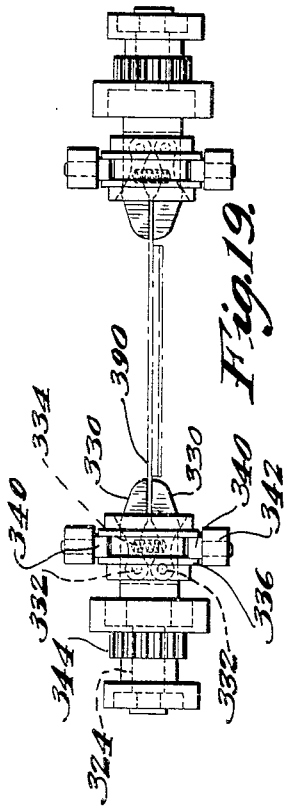
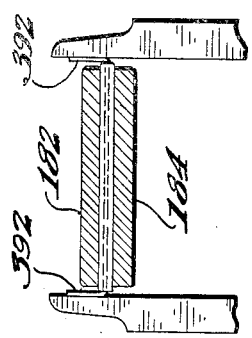
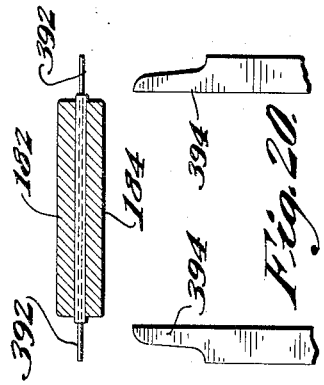
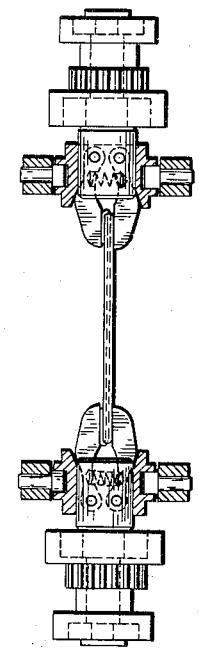
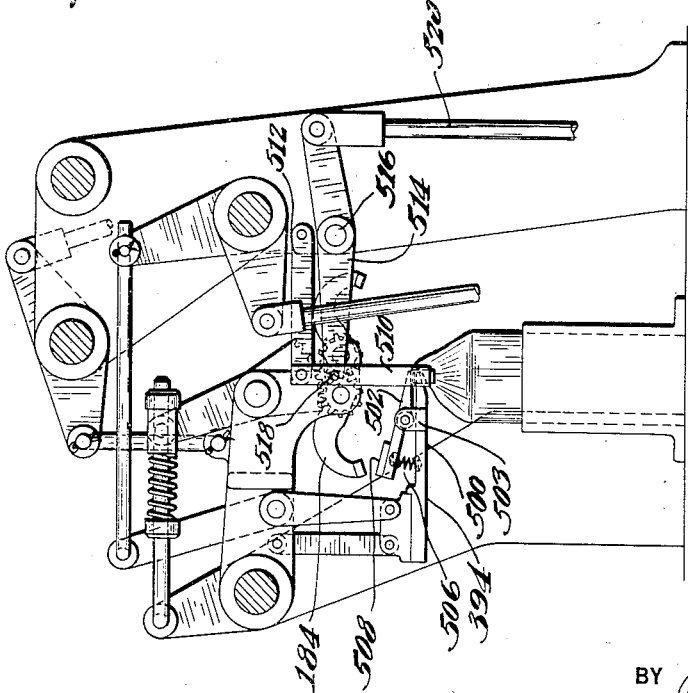
INVENTOR
William A. Joplin
BY J. Stanley Churchill
ATTORNEY Patented Nov. 8, 1932

1,886,552

UNITED STATES PATENT OFFICE

WILLIAM A. JOPLIN, OF NORFOLK DOWNS, MASSACHUSETTS, ASSIGNOR TO PNEUMATIC SCALE CORPORATION, LIMITED, OF QUINCY, MASSACHUSETTS, A CORPORATION OF MASSACHUSETTS

BAG CLOSING AND FASTENING MACHINE

Application filed June 20, 1931. Serial No. 545,777.

This invention relates to a bag closing machine and more particularly to a machine for closing the mouths of filled bags of the type which are provided with bendable clamping members attached to and projecting laterally from the mouth of the bag.

One object of the invention is to provide a novel and improved construction of bag closing machine by which mags may be closed in an economical and simple manner at a minimum cost and in a manner such as to permit the bag to be opened by the user and to be subsequently closed.

A further object of the invention is to provide a novel and improved machine for automatically closing filled bags of the type provided with clamping members projecting laterally from the mouth portion of the bag to the end that the bag may be retained in a closed postion by the cooperation of the clamping members with folded portions of the mouth of the bag.

A still further and more specific object of the invention is to provide a novel bag closing machine for operation upon filled bags of the type which have been used for packing coffee and the like and which comprise paper bags having their side portions provided with natural inward folds and the rear portion of which is provided at its top with a bendable reenforcing strip, the ends of which are arranged to project laterally beyond the sides of the bag and which is adapted to be used in folding the front and rear sides of the bag to close the bag and to permit the projecting ends of the strip to be bent into a position to cooperate with the folded portion to retain the bag in a closed position.

With these objects in view and such others as may hereinafter appear, the invention consists in the bag closing machine and in the various structures, arrangements and combinations of parts hereinafter described and particularly defined in the claims at the end of this specification.

Figure 2:
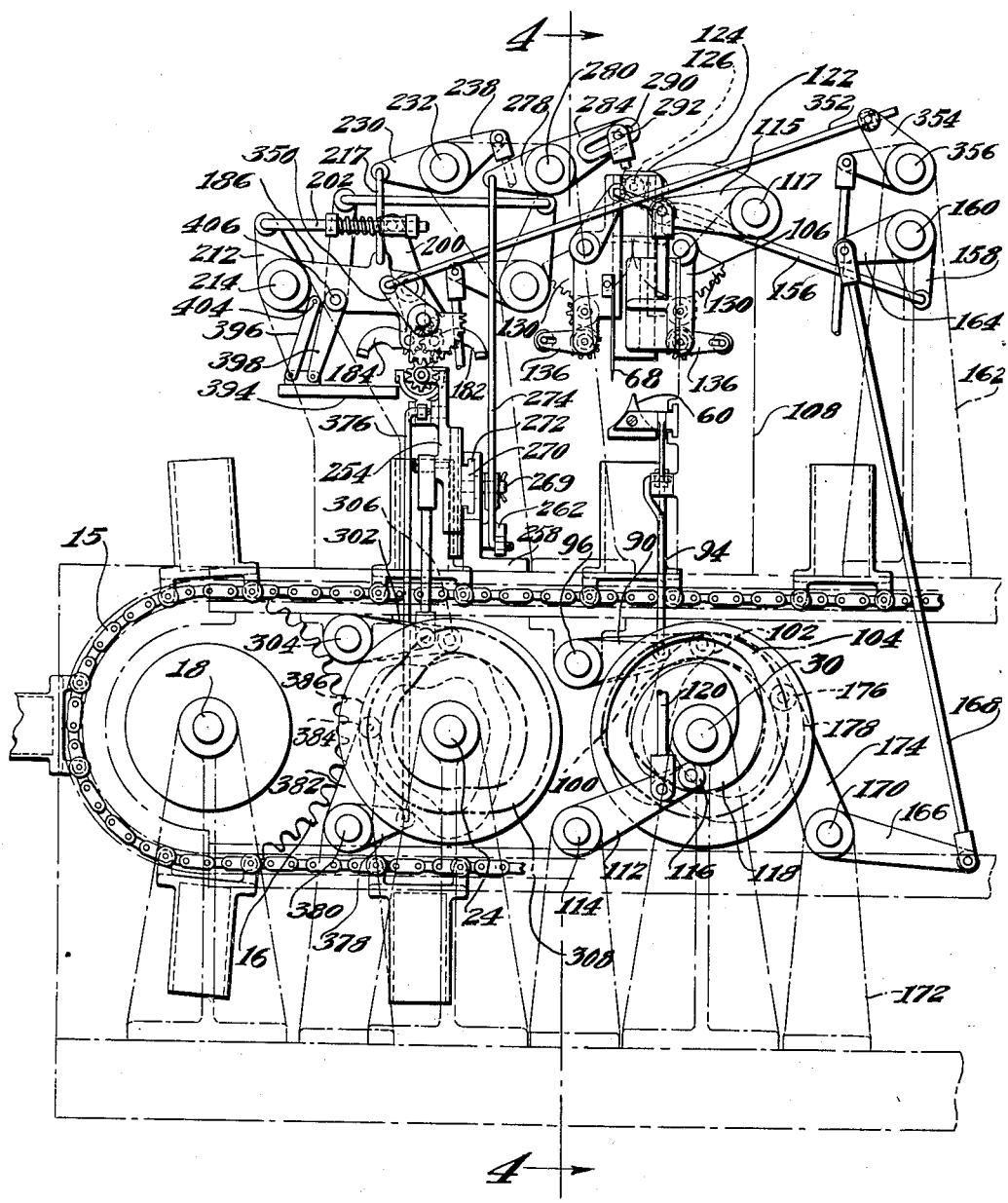
Figure 3:
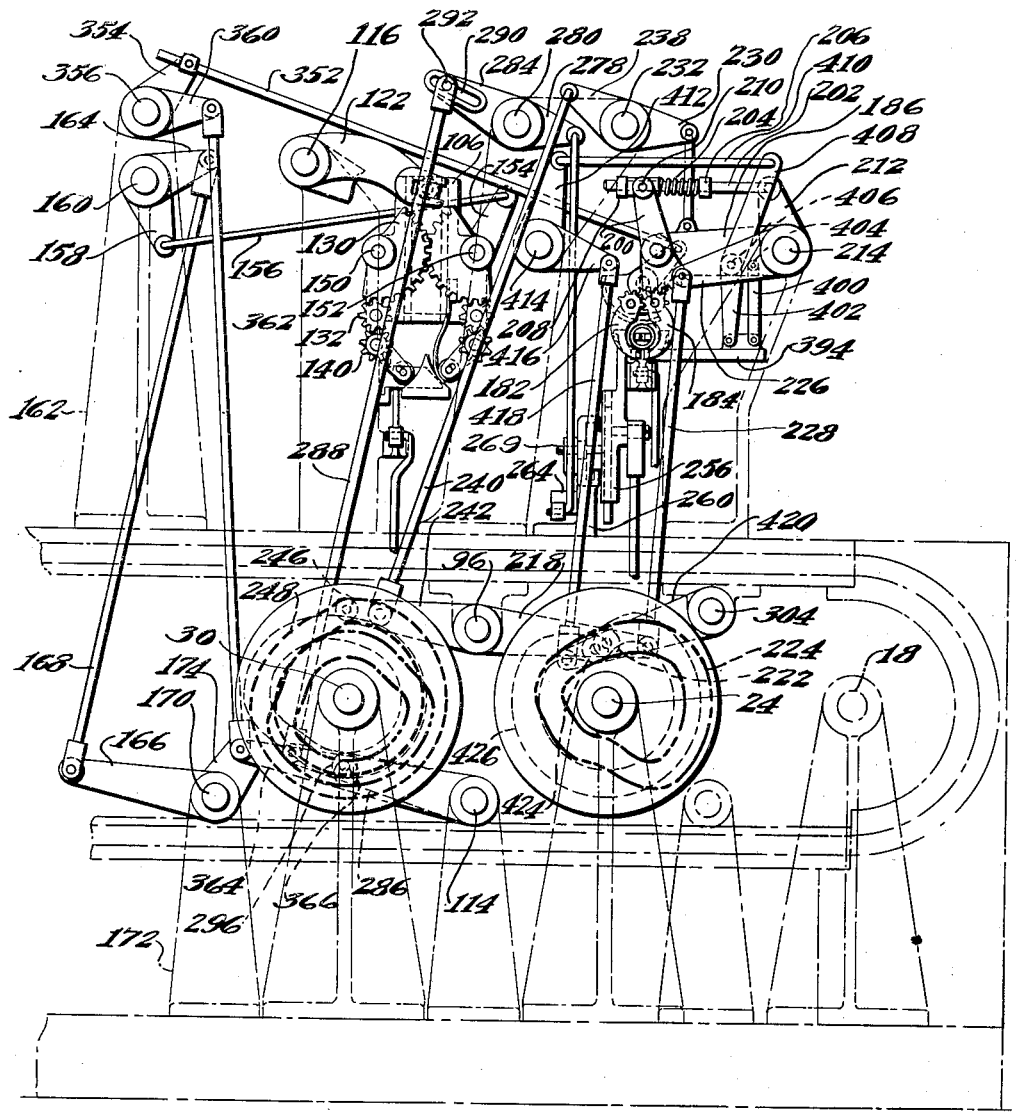
Figure 4:
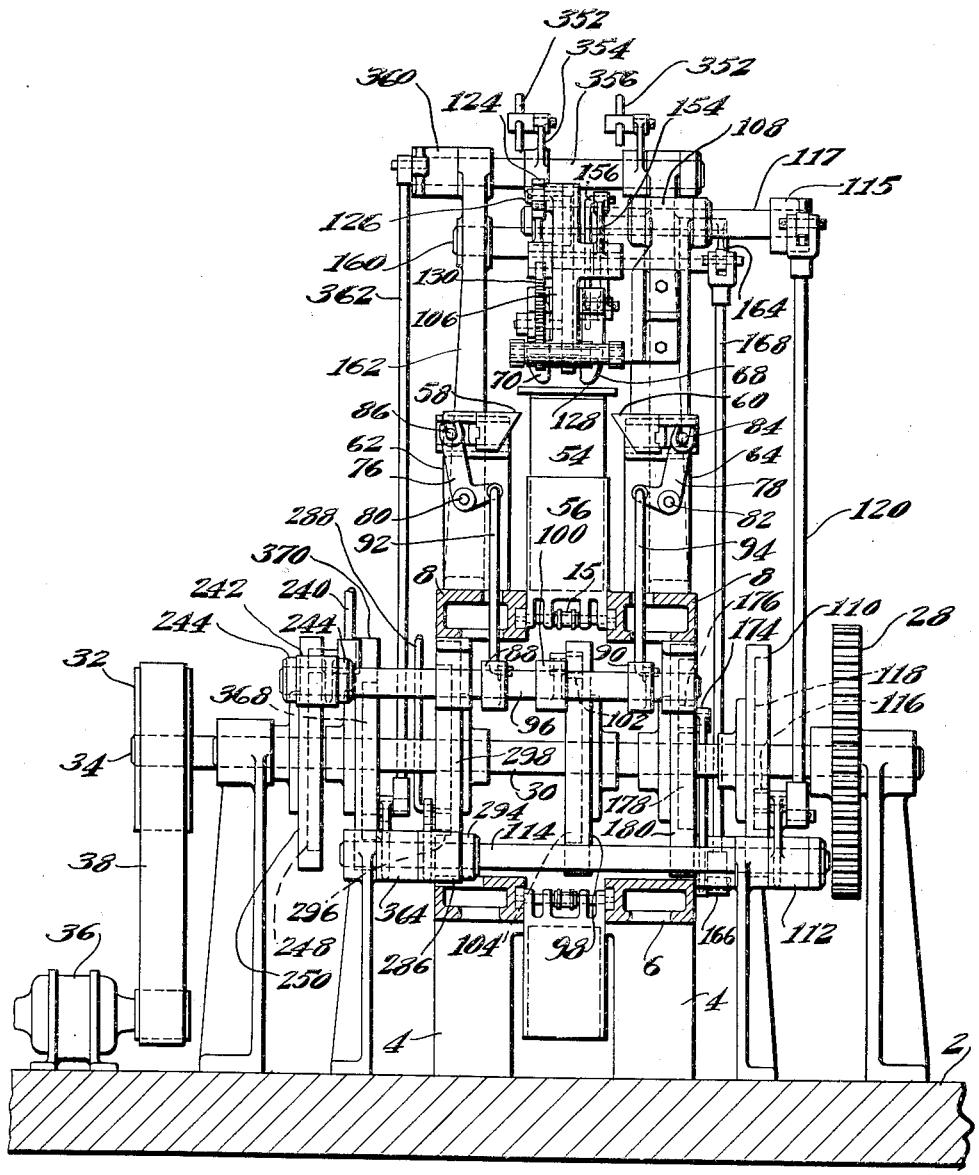
Figure 5:
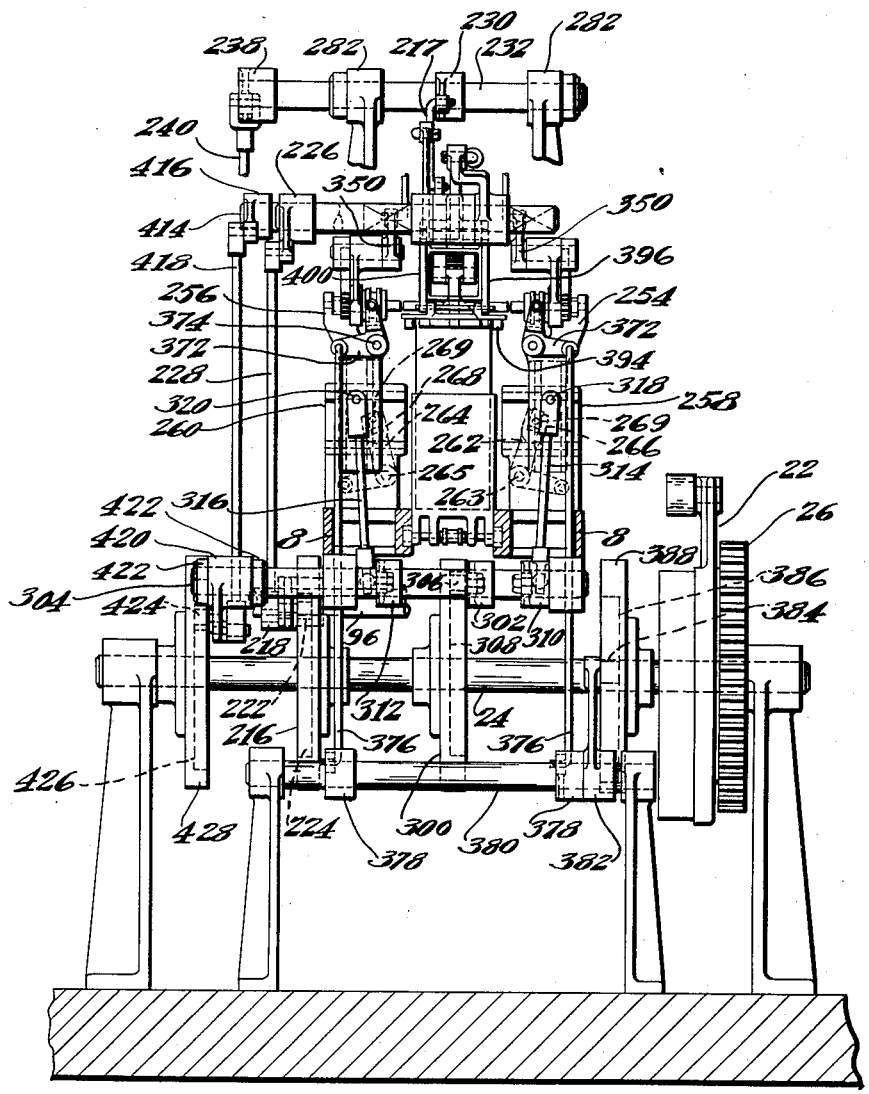

In the drawings illustrating the preferred embodiment of the invention, Fig. 1 is a side elevation of the complete machine; Fig. 2 is a side elevation of the folding and closing mechanism; Fig. 3 is a side elevation viewed from the side of the machine opposite that shown in Fig. 2; Fig. 4 is a section on the line 4—4 of Fig. 2; Fig. 5 is a sectional view taken on line 5—5 of Fig. 1; Figs. 6, 7 and 8 are detail views of the forming and closing mechanism; Figs. 9 and 10 are end and side views respectively of the bag clamping mechanism; Fig. 11 is a side elevation, partly in section, of the gripping members; Fig. 12 is an end elevation viewed from the right in Fig. 11; Figs. 13, 14, 15 and 16 are perspectives illustrating various stages in the closing and fastening of the mouths of the bags; Fig. 17 shows an alternative method of closing the bag with the fastening members in between the folds; Fig. 18 is a sectional view through the closed top of the bag; Figs. 19, 20, 21 and 22 are details illustrating various steps in the folding of the bag fastening member; and Fig. 23 shows an alternative device for fastening the top of the bag in the manner shown in Fig. 17.

In general the present invention contemplates a bag closing machine for closing the bags by the cooperative action of folding the top or mouth portion of the bag and the clamping of the mouth portion thus folded by means of clamping members. In its preferred form the invention is embodied in a machine for operating upon filled paper bags of the type which have heretofore been used and which are provided with a bendable fastening tab or strip comprising a paper covered metal strip attached to the mouth of the bag to extend transversely across the same and project a short distance beyond each side edge thereof. Provision is made in the machine for operatively supporting a filled bag of this character and for performing folding operations upon the mouth of the bag to fold the mouth of the bag through a number of convolutions to close the same. Provision is made for bending the projecting ends of the fastening tab or strip into a position to retain the folded portions of the mouth of the bag in their folded positions and to thus retain the bag in its closed position. The filled and closed bag is designed to be opened by the user of the contents of the bag and to be capable of being again folded and closed by hand, and the aim of the present invention is to provide an efficient machine for performing the folding and bending operations referred to to close the bag in a simple and efficient manner.

In the illustrated embodiment of the invention the bag closing machine forms a part of a machine for feeding collapsed bags from a stack A and delivering them in an opened condition first to a printing station B where a date or other printed matter may be placed on one side of the bag, thence to a station C where a predetermined quantity of material may be deposited in the bag as by weighing, then to a tapping or settling station D where the material is settled in the bag, and then to a station E where the top of the bag is shaped and pressed together ready to be fastened. The bag in this condition is then moved to the station F where closing mechanism operates to close the top of the bag by folding and to fasten the mouth of the bag in its closed position by bending the ends of the fastening tab or strip into engagement with the folded portion of the bag. Thereafter the closed bag is moved to an ejecting station herein shown at G where the filled and closed bag is discharged from the machine.

The mechanism for opening the bag, printing the date or other printed matter thereon, depositing or weighing the material in the bag, and the tapping mechanism may comprise any of the well-known mechanisms which are used in filling and weighing machines, and inasmuch as these mechanisms per se form no part of the present invention, only sufficient portions thereof have been herein illustrated and will be hereinafter described as will enable the present invention to be understood.

The present bag closing machine is particularly adapted for use in connection with the packaging of materials like coffee in paper bags and the paper bags are manufactured and supplied in a collapsed condition in which the body of the bag is provided with inwardly extended side folds and the front and rear sides of the bag are pressed together. The bottom of the bag is folded up and pressed against the front side of the bag, and in this collapsed condition a supply of the bags is stacked in a bag feeding chute forming a part of the bag feeding or supplying mechanism A. As above stated, the details of construction and mode of operation of bag supplying mechanisms may and preferably will comprise that of any of the prior art mechanisms heretofore employed for such purpose in prior art bag filling machines, and for the purposes of understanding the present invention it is believed to be sufficient to state that the endmost bag in the stack is sliced from the stack by an oscillatable knife member 11 designed to be moved in timed relation to the operation of the machine and to enter the endmost bag, move it downwardly and to open it and deposit it in a pocket or holder 13. The holder 13 comprises one of a series of such holders operatively supported upon a conveyor chain 15, and provision is made for intermittently moving the conveyor chain to present the bag thus opened and deposited in the holder 13 to succeeding stations, as will be described. As illustrated herein, the conveyor chains 15 run in guides 6, 8, operatively supported upon upright frame members 4 and secured to the base plate 2 of the machine frame. The conveyor chains 10 are arranged to run over sprockets 12, 16, and the sprocket 12 is fastened to a shaft 14 running idle in its bearings in the frame members 4. The sprocket 16 is fast to the shaft 18 and is arranged to be driven by driving mechanism including a four-point Geneva wheel 20 fast on the shaft 18. The shaft 18 is driven intermittently from the motor 36 through a Geneva driving arm 22 fast on a shaft 24. The shaft 24 is provided with a gear 26 fast thereon which is driven by a gear 28 fast on a shaft 30. The shaft 30 is driven by a pinion 32 which cooperates with the gear 28. The pinion 32 is fast on a shaft 34 driven by the motor through the belt 38 and pulley 40, the latter being fast on the shaft 34.

The shafts 24 and 30 comprise cam shafts upon which are mounted the various cams for operating the mechanisms for shaping the top of the bag in closing the mouth of the bag by folding and for operating upon the fastening strip or tabs, as will be hereinafter described. It will be observed that these cam shafts 24, 30 are driven with continuous uniform motion while the conveyor chains 15 carrying the pockets 13 for operatively supporting the bags are driven with a step by step intermittent motion and the various cams on the shafts 24, 30 are so designed as to cause the operations referred to to be performed while the bag and conveyor pockets 13 are at rest. The machine is also provided with a cam shaft 48 upon which cams for operating the printing mechanism and the bag opening mechanism for performing the operations at the stations A and B, and as herein shown provision is made for driving the cam shaft 48 through a longitudinal drive shaft 42 operatively connected through the shaft 34 by bevel gears 44, 46 and operatively connected with the shaft 48 by bevel gears 50, 52.

From the description thus far, and from an inspection of Fig. 1, it will be apparent that in the illustrated machine successive bags are withdrawn from the end of the stack at the station A and are each opened by the descent of the member 11 and deposited into successive pockets as successive pockets are brought into station A during the intermittent movement of the chain. As the chain continues in its intermittent motion the open bag is moved into station B where the printing operation is performed by printing elements 17 operative at the proper time by a cam on the cam shaft 48 to print the desired printed matter on the bag. Thereafter the pocket with its bag is moved by the chain into station C where a predetermined quantity of the coffee or other material is deposited from a supply hopper 19 and weighing mechanism 21 through a delivery chute 23 to within the bag. The operation of the weighing mechanism and the deposition of the material through the chute and into the bag is controlled in the manner usual in bag filling and weighing machines, and inasmuch as the details of such control mechanism are themselves well-known and form no part of the present invention, further description thereof is believed to be unnecessary. Similarly, after the bag has thus been filled with the desired quantity of coffee or other material, the pocket and its bag are moved into station D where the usual form of tapping mechanism may operate to shake down the material in the bag. After the bag has thus been filled, it is moved in its pocket into station E where the first operations in closing the top of the bag are performed.

In order to prepare the top of the bag for the bag closing operations, provision is made for folding inwardly the two sides of the bag and to bring the upper portion of the front and rear walls of the bag in close proximity, and for this purpose and as best shown in Figs. 6, 7 and 8, forming members 58, 60, slidably mounted on brackets 62, 64, are caused to move inwardly and to thereby cause the central fold 66 of each side of the bag to collapse inwardly. Just prior to the movement of the forming members 58, 60, two flexible supporting strips 68, 70 are caused to move downwardly into the open mouth of the bag to support the bag material and to aid in defining the outside folded edges 72, 74 of one side of the bag. In order to move the forming members 58, 60 to form the described operation, the latter are caused to move in and out by connections from a cam 98 fast on the shaft 30, and as herein shown the forming members 58, 60 have cooperating therewith bell cranks 76, 78 pivotally mounted on the brackets 62, 64 at the points 80, 82, and the upper end of the bell crank levers are forked and cooperate with pins 84, 86 projecting from the forming members. The second end of the bell crank levers are connected to levers 88, 90 by means of connecting rods 92, 94 and the levers 88, 90 are made fast on the shaft 96. Provision is made for imparting rocking motion to the shaft 96 by means of the cam 98 on the shaft 30 through a cam lever 100 also fast on the shaft 96 and a cam roll 102 which operates in a cam path 104 of the cam 98. The mechanism for operating the supporting strips 68, 70 to move them downwardly into the open mouth of the bag is described as follows. The supporting strips 68, 70 are herein shown as fastened to a slide member 106 slidably mounted on an upright bracket 108, and provision is made for vertically reciprocating the slide member 106 through connections from an operating cam 110 comprising the cam lever 112, one end of which is free on the shaft 114, and the other end of which is provided with a cam roll 116 operating in a cam path 118 in the cam 110. A connecting rod 120 is pivotally connected to the cam lever 112 and to a lever 115 fast on the shaft 117 journalled in the bracket 108. A lever 122 having an open forked end 124 is attached to the opposite end of the shaft 117 and the open forked end 124 embraces a pin 126 upon the slide member 106, thereby completing the connections from the operating cam 110 to the slide member 106 so that the above described vertical motion is imparted to the supporting members or strips 68, 70 during each cycle of operation of the machine.

Provision is also made for folding inwardly the upper rear portions of the front and rear sides or walls of the bag in order to bring such walls in close proximity to each other preparatory to the subsequent folding operation in order to close the bag, and as herein shown, particularly in Figs. 7 and 8, the machine is provided with a pair of creasing rolls 128 which are mounted to swing on the slide member 106 and to be movable vertically therewith. The creasing rolls 128 are arranged to have an oscillatory or swinging motion imparted to them by operating segments 130 which turn idler pinions 132 mounted free to turn on the studs 134 fast in the slide member 106. The pinions 132 cooperate with pinions 140 mounted upon shafts 142 having bearings in the slide member 106 and through the pinions 140 impart motion to the arms 136 which are secured to the shaft 142. The rolls 128 are provided with turned-down portions 144 free to turn within slots 146 in the arms 136, and springs 148 are provided in the arms 136 to hold the rolls 128 under spring tension in their extreme outward position to thereby cause the rolls to exert a yielding pressure in folding when pressing the front and rear walls of the bag toward each other in the manner illustrated in Fig. 7.

In order to impart a rocking movement to the segments 130, connections are provided between the segments and an operating cam 180 and which may be described as follows. The segments 130 are fast on pins 150, 152 journalled in the slide member 106. The pin 152 has fastened to it a lever 154 connected by a connecting rod 156 to a lever 158 fast on a pin 160 journalled in a bracket 162. A lever 164 is also fastened to the pin 160 and is operated by a lever 166 through a connecting rod 168. The lever 166 is fast on a shaft 170 journalled in brackets 172 and the shaft 170 is also provided with a cam lever 174 secured thereto and having a cam roll 176 which operates in the cam path 178 of the cam 180. In the operation of the machine, the cams 98, 110 and 180 are preferably so timed that the slide member 106 is caused to move downwardly slightly in advance of the endwise movement of the forming members 58, 60, and on the completion of the downward movement of the slide member 106 and of the endwise movement of the forming members 58, 60, the rolls 128 are caused to swing downwardly and inwardly to press and crease the upper portion of the bag over the forming members 58, 60, so that when the forming members and slide member 106 retract, the mouth of the bag will be pressed together so that the front and rear walls thereof are substantially in contact and so that the bag is in a condition ready for the folding operation to close the bag to be performed upon it.

After the described operations have been performed at the station E, the bag is moved by the conveyor chains along to the station F where the operations of folding the top of the bag into rolled formation and the bending of the fastening member to secure the bag in a closed position are performed. As herein shown, the machine is provided with a pair of gripper members 182, 184 which are designed to engage the opposite sides of the upper portion of the closed mouth of the bag in the manner illustrated in Fig. 9, and in order to actuate the grippers to cause them to engage and grip the bag, the grippers are rotatably mounted upon a bracket 186, being secured upon pins 188 free to turn in their bearings in the bracket 186. The hubs of the gripper members 182, 184 are provided with gear teeth 192, 194 arranged to mesh and to be operated by an operating segment 196 meshing with the teeth 194 on the hub of the gripper 184. The segment 196 is pivotally mounted on the bracket 186 by a pin 198, the pin being fastened in the segment and free to turn in its bearing in the bracket 186. The segment 196 is provided with an extension 200 connected by a connecting rod 202 to the outer end of a lever 212 fastened to a shaft 214 and receiving a rocking motion from a cam 216 through a cam lever 218 fulcrumed on the shaft 96. The cam lever 218 is provided with a cam roll 222 operating in the path 224 of the cam 216. The lever 218 is connected to a lever 226 by a connecting rod 228 so that both the opening and closing motion is imparted to the grippers 182, 184 from the cam 216 through the connections described. The connecting rod 202 above described is provided with a spring 204 and collars 206, 208, and with a swivel bearing pin 210 as shown in Fig. 3 so that a yielding pressure will be applied to the top of the bag by the grippers 182, 184 when closed.

The bracket 186 upon which the gripper members 182, 184 are mounted is itself mounted to swing on the shaft 214, see Figs. 2 and 3, and provision is made for rocking the swinging bracket 186 and the grippers mounted thereon to move the grippers into and from opposite positions, as will be described. As herein shown, the bracket 186 has connected to it at 220 a connecting rod 217 by which the bracket is operatively connected to a lever 230 fast on a shaft 232 rotatably mounted in brackets 282. The shaft 232 is provided on its outer end with a lever 238 and the outer end of the lever 238 is operatively connected with a lever 242, see Fig. 4, mounted free to turn on the shaft 96 and held in position by collars 244. The lever 242 is provided with a cam roll 246 operating in a path 248 of a cam 250 fast on the shaft 30, and the cam 250, through the connections described, imparts through the operation of the machine a reciprocatory motion to the swinging bracket 186 to properly position the gripping members 182, 184, as will be described.

Referring now to Figs. 9 and 14, it will be observed that the gripping members 182, 184 serve initially to press together the front and rear walls of the mouth of the bag, engaging the bag at points some distance below the top thereof in the manner illustrated in Fig. 9. In the illustrated bag upon which the present machine is particularly designed to operate, the upper edge of the rear wall of the bag is provided with the bendable fastening member or strip 390, herein shown as secured to such wall by a connecting flexible strip of paper or the like adhesively affixed to such rear wall as shown. In practice the bendable fastening strip or member 390 comprises a paper covered lead or other bendable metal strip, and in the operation of the machine the fastening strip 390 is engaged by the gripping jaws 330 of rotatable chucks at each end of the strip, and the strip is revolved through a complete revolution operating to roll down the top of the bag and to position the strip 390 within folded portions of the top of the bag, as illustrated in Fig. 15, and in section in Fig. 18, thus effectively closing the mouth of the bag. The projecting ends of the strip 390 are then folded into a position such as to retain the rolled portion of the bag in its bag closing position, and in the preferred embodiment of the invention the projecting ends of the bendable fastening strip 390 are preferably folded rearwardly and over upon the rear wall of the bag and pressed into clamping position to clamp both walls of the bag between the strip and the bent ends thereof. For certain purposes, however, it may be desirable to introduce the projecting ends of the strip between the front and rear walls of the bag in the manner illustrated in Fig. 17, and an alternative form of mechanism is herein shown for performing this operation and will be hereinafter described. Provision is also made for operating the gripping members 182, 184 to permit the rolling of the top of the bag and to hold the rolled portion of the bag while the projecting ends of the fastening strip are being folded into bag engaging and fastening position.

Referring now to Fig. 11, the machine is provided with a pair of chucks indicated generally at 322 mounted upon brackets 254, 256. Both chucks are of identical construction and one of which is shown in Fig. 11, and as therein shown the spindle 324 of the chuck is rotatably mounted in bearings 326, 328. Each chuck comprises two jaws 330 pivoted at 332 in the spindle 324 in such manner that they may be swung open and closed. A spring 334 is provided tending to open the jaws, and a sliding sleeve 336 having an annular groove channel 338 into which the pin 340 of the yoke 342 fits operates to close the jaws when the sleeve is moved outwardly.

In order to rotate the chucks 322 and consequently the gripping jaws 330 to perform the rolling down of the top of the bag in the manner described, each chuck spindle 324 is provided with a pinion 344 fast thereon, and connections are provided between the pinions 344 and operating cams 370, and each of which connections includes a segment 346 fast on a pin 348 meshing with the pinion 344 and which is free to turn in its bearing in a bracket 256. A lever 350 is secured upon the opposite end of the pin 348 and has pivotally attached thereto a connecting rod 352. The latter is connected to the outer end of a lever 354 fast on a shaft 356 journaled in the upright brackets 162. On the end of the shaft 356 is fastened a lever 360, the outer end of which is connected by means of a connecting rod 362 to a lever 364 pivotally mounted on the shaft 114. A cam roll 366 is carried by the lever 364 and operates in the path 368 of the cam 370.

In order to effect the closing of the gripping jaws 330 at the proper time in the operation of the machine just prior to the rolling down of the top of the bag, provision is made through connections from an operating cam 388 for imparting a horizontal sliding motion to the sleeve 336, and as herein shown an arm 372 is formed as part of the yoke member 342 and is pivoted on the screw 374 held in the brackets 256. A connecting rod 376 connects the end of the arm 372 with a lever 378 fast on a shaft 380. A cam lever 382 is also fast on the shaft 380 and has mounted on its outer end a cam roll 384 which operates in the cam path 386 of the cam 388 fast on the shaft 24. A horizontal sliding motion is thus imparted to the sleeve 336 by the operation of the cam to close the grippers 330 upon the metal fastening member 390. After the grippers 330 close upon the fastening member 390 the chucks 322 are caused to make one revolution thus rolling the fastening member and the top of the bag downwardly to effect closing of the bag. While this operation is being performed the gripper members 182, 184 are caused to release the top portion of the bag, and as soon as the rotation of the chuck members 322 is completed the gripper members 182, 184 are again closed upon the rolled top of the bag and operate to hold the rolled top portion of the bag firmly while the projecting ends 392 are folded through right angles by fingers 394 hereinafter described. After the ends of the fastening member 392 have been bent at right angles, as hereinafter described, the gripper members 182, 184 are again opened and the chucks 322 are caused to slide toward the fastening member 390, the jaws 330 of said chuck being open and bend in and squeeze the ends 392 of the fastening member back against the bag, as shown in Fig. 22, thus effectively clamping the rolled top of the bag in bag closing position.

The fingers 394, which bend the end portions 392 of the fastening member 390 through the initial right angle, are supported by the links 396, 398 so that the fingers 394 have substantially a straight line motion. The links 396, 398, 400 and 402 are pivotally attached to the arm 186 by the pins 404, 406, and provision is made for effecting the motion of the fingers from a cam 428, and for this purpose the link 402 has an extension arm 408, the outer end of which is connected by means of a connecting rod 410 to an arm 412 fast on the shaft 414 mounted free to turn in bearings in the bracket 282. On the end of the shaft 414 is fastened an arm 416 connected through a connecting rod 418 to a cam lever 420 pivotally mounted on the shaft 304 and held in position by collars 422. The lever 420 is provided with a cam roller 424 which operates in the cam path 426 of the cam 428 fast on the shaft 24, and through the connections described imparts a horizontal motion to the fingers 394 to perform the bending operations.

In order to effect movement of the chucks 322 inwardly in the manner described in order to permit the jaws 330 to be closed upon and to squeeze the ends 392 of the fastening strip 390 to thereby hold the rolled portion of the bag from becoming unrolled, provision is made for imparting a horizontal sliding movement to brackets 254, 256 upon which the chucks 322 are mounted. As herein shown, the brackets 254, 256 are mounted to slide both vertically and horizontally on stands 258, 260 attached to the top frame members 8. The horizontal sliding movement of the brackets 254, 256 is derived from a cam 298 fast on the shaft 30 through connections including bell crank levers 262, 264 fulcrumed on pins 263, 265 in the stands 258, 260. One set of arms of the bell crank levers are provided with open ends 266, 268 which fork over pins 269 carried by horizontal slide members 270 arranged to slide in guideways 272 of the stands 258, 260. The other end of the bell crank levers 262, 264 are connected by connecting rods 274, 276 to levers 278 fast on a shaft 280. This shaft is journaled in stands 282 and is rocked by means of a lever 286 by a connecting rod 288. A slot 290 in the outer end of the lever 284 is provided for adjusting the fulcrum point 292 of the connecting rod 288. The lever 286 is mounted to turn freely on the shaft 114 and is held in position on the shaft by a collar 294. The cam roll 296 is mounted on the lever 286 and operates in a path of the cam 298 fast on the shaft 30. From the above description it will be apparent that a horizontal sliding motion is imparted to the brackets 254, 256 and the slide members 270 formed integrally therewith by the operation of the cam 298 through the connections described.

As above described, provision is made for moving the brackets 254, 256 and the chucks 322 mounted thereon vertically in order to permit the chucks to move downwardly as they operate to revolve the fastening strip 390 and to thereby roll down the top of the bag over the strip, and as herein shown this vertical motion is imparted to the brackets 254, 256 by the cam 300 fast on the shaft 224. A cam lever 302 fast on the shaft 304 is provided with a cam roll 306 operating in a path 308 of the cam 300 to impart a rocking motion to the shaft 304. The levers 310, 312 also fast to the shaft 304 are connected at their outer ends to connecting rods 314, 316. The other ends of the connecting rods are connected to pins 318, 320 fast in the vertical slide brackets 254, 256, so that during the operation of the machine the cam 300 through the connections described imparts a vertical reciprocating sliding motion to the brackets 254, 256 and to the mechanisms carried thereby.

For some purposes it may be of advantage to bend inwardly the ends of the fastening strip 390 in between the front and rear walls of the bag to produce a closed bag such as is illustrated in Fig. 17. For this purpose an alternative form of bending mechanism such as is illustrated in Fig. 23 may be employed, associated with the remaining mechanisms of the machine as previously described. Referring now to Fig. 23 and to Fig. 17, it is preferred to revolve the chucks 322 and the fastening strip 390 through a complete revolution and then to give the strip an additional quarter turn, so that the strip will be in a substantially horizontal position. Provision is then made for gripping and holding the strip and the rolled portion of the mouth of the bag during the bending of the end of the fastening strip, and as herein shown an elongated gripper 500 formed by gripping jaws 502 pivoted in ears 503 on the plate 394, previously described, is provided. A spring 506 serves to urge the jaws into a closed position. The rear end of the gripping jaw 502 is provided with a bearing plate 508 which is attached to be engaged by one of the gripping jaws 184 previously described when the latter is moved into operative position. As the gripper 184 descends it engages the plate 508 and opens the jaw 502 so that the plate 394 is advanced through the connections previously described to move the jaws 502 into a position ready to engage and grip the fastening strip and the rolled portion of the mouth of the bag when the gripper member 184 releases the plate 508 and permits the spring 506 to close the jaws, this condition being illustrated in Fig. 23.

While the rolled portion of the bag is thus firmly held by the jaws 502, provision is made for folding downwardly through a right angle each projecting end of the fastening strip 390, and as herein shown a pair of fingers 510 are mounted upon a lever 512 and a straight line downward motion is imparted to the fingers through the operating lever 514 pivoted at 516 upon a part of the machine frame and having its outer end pivotally connected at 518 to the fingers 510. The lever 514 is connected by a connecting rod 520 to a suitable cam, not shown, for perfecting the reciprocatory vertical motion of the fingers 510. After the ends of the fastening strip 390 have been thus bent downwardly through a right angle the chuck jaws 330 in their open condition are moved inwardly and engage the ends of the fastening strips and bend them inwardly between the front and rear walls of the bag through an additional angle of 90° and the chuck is then operated to close the jaws to squeeze the ends of the fastening strips under the rolled portion of the bag, it being understood that the upper jaw 330 of each chuck will engage the top of the rolled portion of the bag. Thereafter provision is made for imparting a quarter turn to the chucks 322 to move the rolled portion of the bag and the fastening strip into a position such as is illustrated in Fig. 17 in which the fastening strip assumes a substantially vertical position. It will be understood that just prior to the movement of the chuck jaw 330 inwardly to perform the final bending operation the gripper member 184 will be caused to descend and to effect an opening of the gripping jaw 502 and the plate 394 will through its cam be withdrawn.

It will be understood that suitable modification will be made in the design of the particular cams for effecting the described operations, but it is not deemed necessary to illustrate herein such modified design of cams as these may be readily designed to accomplish the described functions.

While the preferred embodiments of the invention have been herein illustrated and described, it will be understood that the invention may be embodied in other forms within the scope of the following claims.

Having thus described the invention what is claimed is:—

1. In a bag closing and fastening machine, in combination, means for operatively supporting a filled bag, means for engaging and rolling the upper portion of the mouth of the bag to close the same, said means remaining in engagement with the mouth of the bag to retain control thereof during the entire rolling operation, and means for moving a clamping member into engagement with the rolled portion of the bag to retain it in bag closing position.

2. In a bag closing and fastening machine, in combination, means for operatively supporting the filled bag, means for engaging and folding the upper portion of the mouth of the bag to close the same, said means remaining in engagement with the mouth of the bag to retain control thereof during said folding operation, and means for moving a clamping member into a position to retain the folded portion of the bag in its bag closing position.

3. In a bag closing and fastening machine, in combination, means for operatively supporting a filled bag of a character having a bendable fastening strip at the upper portion of the bag, means for engaging and folding the upper portion of the mouth of the bag to close the same, said means remaining in engagement with the mouth of the bag to retain control thereof during said folding operation, and means for bending an end of the fastening strip into a position to engage the bag and hold the folded portion of the top of the bag from unfolding.

4. In a bag closing and fastening machine, in combination, means for operatively supporting a filled bag provided with a bendable fastening strip at the upper portion of one wall thereof, means for revolving the bendable fastening strip to effect a rolling of the top of the bag to thereby close the bag, and means for thereafter bending an end of the fastening strip into a position to engage the bag and hold the rolled portion of the bag from unrolling.

5. In a bag closing and fastening machine, in combination, means for operatively supporting a filled bag having a bendable fastening strip attached to one wall thereof, means for gripping the ends of the fastening strip and for revolving it to roll down the top of the bag around the fastening strip, and means for thereafter bending the ends of the fastening strip into engagement with the bag to thereby hold the rolled portion of the bag from unrolling.

6. In a bag fastening and closing machine, in combination, means for operatively supporting a filled bag having a fastening device attached to the upper portion of one wall thereof, means for folding inwardly the side walls of the bag, means for pressing together the front and rear walls of the bag, means for thereafter folding the upper portion of the bag to close the same, and means for moving the fastening device into operative position to hold the folded portion of the bag and prevent it from becoming unfolded.

7. In a bag fastening and closing machine, in combination, means for operatively supporting a filled bag having a fastening strip secured to one of the walls thereof, means for engaging the opposite ends of the fastening strip and for revolving it to roll down the top of the bag around the fastening strip, and means for thereafter bending the ends of the strip through substantially 180° to clamp the rolled portion of the bag in bag closing position.

8. In a bag fastening and closing machine, in combination, means for operatively supporting a filled bag having a fastening strip attached to the upper portion of one wall thereof, a gripping device for engaging the mouth of the bag and holding the front and rear walls thereof together, a pair of rotatable chucks adapted to cooperate with the top of the bag for rolling the top of the bag to close the same, and means for moving the fastening strip into operative position to removably hold the rolled portion of the bag in bag closing position.

9. In a bag fastening and closing machine, in combination, means for operatively supporting a filled bag having a fastening strip attached to the upper portion of one wall thereof, a gripping device for engaging the mouth of the bag and holding the front and rear walls thereof together, a pair of rotatable chucks adapted to cooperate with the top of the bag for rolling the top of the bag to close the same, and means for bending the ends of the fastening strip into engagement with the bag to hold the rolled portion of the bag in bag closing position.

10. In a bag closing and fastening machine, in combination, means for operatively supporting a filled bag provided with a bendable fastening strip at the upper portion of one wall thereof, a gripping device for engaging the mouth of the bag and pressing the front and rear walls thereof together, a pair of rotatable chucks for cooperating with the ends of the bendable fastening strip and adapted to roll the top of the bag to close the same, and means for bending the projecting ends of the fastening strip over the side edges of and into engagement with the rear wall of the bag to hold the rolled portion of the bag in bag closing position.

11. In a bag closing and fastening machine, in combination, means for operatively supporting a filled bag provided with a bendable fastening strip at the upper portion of one wall thereof, a pair of rotatable chucks for cooperating with the ends of the bendable fastening strip and adapted to roll the top of the bag to close the same, and means for bending the projecting ends of the fastening strip over the side edges of and into engagement with the rear wall of the bag to hold the rolled portion of the bag in bag closing position.

12. In a machine of the character described, in combination, a plurality of holders for a plurality of filled bags, means for intermittently moving the holders through a plurality of stations, means at one station for pressing together the front and rear walls of the bag and for folding in the side folds of the bag, means at a succeeding station for rolling down the top of the bag to close the bag, and means for operatively positioning a fastening device to hold the rolled portion of the bag in bag closing position.

13. In a machine of the character described, in combination, a plurality of holders for a plurality of filled bags, means for intermittently moving the holders through a plurality of stations, means at one station for pressing together the front and rear walls of the bag and for folding in the side folds of the bag, means at a succeeding station for rolling down the top of the bag to close the bag, and means for bending a fastening device into engagement with the bag to hold the rolled portion of the bag in bag closing position.

14. In a machine of the character described, in combination, a plurality of holders for a plurality of filled bags, means for intermittently moving the holders through a plurality of stations, means at one station for pressing together the front and rear walls of the bag and for folding in the side folds of the bag, means at a succeeding station for folding the upper portion of the bag to close the bag, and means cooperating with the ends of a bendable fastening strip forming part of the bag for bending the ends of the strip into engagement with the bag to hold the folded portion thereof in bag closing position.

15. In a machine of the character described, in combination, means for operatively supporting the filled bag, means for folding in the side folds of the bag including a pair of movable forming members and cam operated mechanism for actuating the same, pressing and creasing rolls for pressing together the upper portion of the walls of the bag and for creasing the corner folds of the bag against the forming member, actuating mechanism therefor, and mechanism for thereafter rolling down the top of the bag to close the bag.

16. In a machine of the character described, in combination, means for operatively supporting a filled bag provided with a fastening strip, means for folding in the side folds including a pair of movable forming members and cam operated mechanism for actuating the same, pressing and creasing rolls for pressing together the upper portion of the walls of the bag and for creasing the corner folds of the bag against the forming member, actuating mechanism thereof, mechanism for thereafter rolling down the top of the bag to close the bag, and mechanism for bending the ends of the fastening strip into a position to hold the rolled portion of the bag in bag closing position.

17. In a machine of the character described, in combination, means for operatively supporting a filled bag provided with a fastening strip, mechanism for rolling down the top of the bag including a pair of grippers, means for imparting a vertical and rotary movement thereto, and means for bending the fastening strip to retain the rolled portion of the bag in bag closing position.

18. In a machine of the character described, in combination, means for operatively supporting a filled bag provided with a fastening strip, means for rolling down the top of the bag including a pair of grippers for engaging the ends of the fastening strip, and mechanism for imparting rotary and vertical movement to the grippers, means for bending the ends of the fastening strip, and mechanism for operating the grippers to grip and squeeze the bent portion of the fastening strip to clamp the rolled portion of the bag in bag closing position.

In testimony whereof I have signed my name to this specification.

WILLIAM A. JOPLIN.